March 16, 1926.
W. MILBRATH
MILKING STOOL AND PAIL HOLDER
Filed May 13, 1925
1,577,139
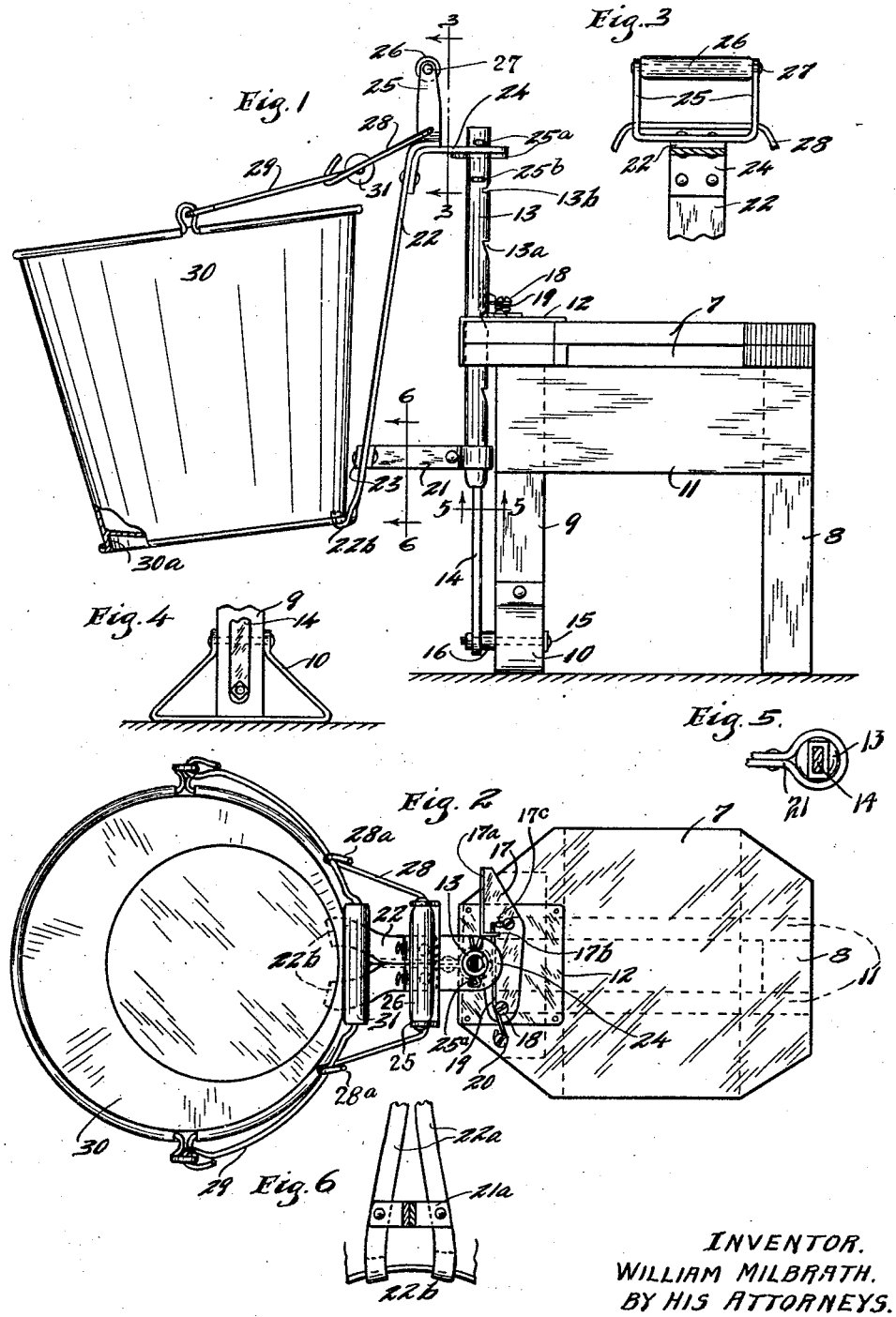
INVENTOR.
WILLIAM MILBRATH.
BY HIS ATTORNEYS.

Patented Mar. 16, 1926.

1,577,139

UNITED STATES PATENT OFFICE.

WILLIAM MILBRATH, OF LAKEFIELD, MINNESOTA.

MILKING STOOL AND PAIL HOLDER.

Application filed May 13, 1925. Serial No. 29,947.

*To all whom it may concern:*

Be it known that I, WILLIAM MILBRATH, a citizen of the United States, residing at Lakefield, in the county of Jackson and State of Minnesota, have invented certain new and useful Improvements in Milking Stools and Pail Holders; and I do hereby declare the following to be a full, clear, and exact description of the invention, such as will enable others skilled in the art to which it appertains to make and use the same.

This invention relates to a pail holder and milking stool. In the operation of milking cows it is customary to have a low stool on which the operator sits and it is desirable to have a convenient bucket or pail holding means supported on the stool so that the bucket or pail will not have to be supported by the operator. It is also desirable to have a device in which the bucket or pail can be held in different positions.

It is an object of this invention, therefore, to provide a milk stool and pail holder of simple and efficient construction in which the parts are very conveniently arranged and in which the bucket can very quickly be disposed at different heights.

It is a further object of the invention to provide such a device comprising a stool having a standard vertically movable at one end thereof together with means for holding said standard in different vertical positions, said standard having pail holding means secured thereto.

It is a further object of the invention to provide a pail holding device comprising a member having upwardly directed hook portions adapted to be disposed under the bottom rim of the pail and having means adapted to hook over the bail or handle of the pail.

It is also an object of the invention to provide a pail holder comprising a vertically movable standard, means extending downwardly and outwardly therefrom and having adjacent its lower end laterally spaced upwardly directed hooks adapted to engage under the bottom rim of the pail and having disposed adjacent its top a swinging bail member having laterally spaced upwardly directed hooks adapted to hook over the handle forming bail of the pail or bucket.

These and other objects and advantages of the invention will be fully set forth in the following description made in connection with the accompanying drawings in which like reference characters refer to the same parts throughout the different views, and in which,—

Fig. 1 is a view in side elevation of the device;

Fig. 2 is a top plan view thereof;

Fig. 3 is a vertical section on the line 3—3 of Fig. 1, as indicated by the arrows;

Fig. 4 is a partial view in front elevation of the device;

Fig. 5 is a horizontal section taken on the line 5—5 of Fig. 1, as indicated by the arrows; and Fig. 6 is a section taken on the line 6—6 of Fig. 1, as indicated by the arrows.

Referring to the drawings, a stool is shown comprising a top or seat portion 7. While this top may be variously shaped, in the embodiment of the invention illustrated, the same is shown as substantially the shape of a rectangle having its corners cut away. A pair of legs 8 and 9 are secured to the top portion 7, which latter portion is shown as formed of two thicknesses of board, and the leg portion 9 has a metal strap 10 secured thereto having a bottom portion of much greater width than the width of said leg and having its ends bent upwardly and inwardly to extend along the sides of said leg 9 and secured thereto by a suitable headed rivet. A pair of brace boards 11 extend along the sides of each of the legs 8 and 9 and between the same. The stool has a plate 12 of rectangular shape disposed on its top front portion, said plate being bent downwardly at substantially a right angle to extend across the front edge of the top 7. Said plate 12, together with top 7 has an aperture formed therein of cylindrical form in which is vertically slidable a standard 13 formed of a tube or pipe, which standard has ratchet teeth $13^a$ formed therein, the horizontal faces of which are disposed downwardly. A standard 14 illustrated as formed of a flat bar, is rigidly secured by a headed and nut-equipped bolt 15 to the lower portion of leg 9, said bar being spaced from the leg 9 by a spacing thimble 16. The bar 14 extends vertically in alinement with the tube 13 and said tube is shaped at its lower end to loosely fit said bar, as shown in Fig. 5. The bar 14 forms a guide means for the tube 13 and this, together with the aperture through members 7 and 12, guides the tube or standard 13 in its vertical movement. A pawl member 17 is provided which, in the embodiment of the invention illustrated, is formed as a plate having a flat surface in engagement with plate 12 and pivoted thereto about a pivot bolt or screw 18. Said plate 17 has its front edge bent upwardly substantially at a right angle, as shown at 17$^a$ to form a finger or handle portion, the inner part of the vertical portion 17$^a$ again being bent rearwardly substantially at a right angle, as shown at 17$^b$. A spring 19 is coiled and disposed about the screw 18 and has one end secured to another screw 20 disposed in top 7 while the other end of said spring extends through an aperture in the portion 17$^b$. The spring thus tends to swing plate 17 toward the front of top 7, said plate being guided and limited in its movement by a slot 17$^c$ therein through which extends a headed screw seated in the plate 12. The front edge of the plate 17 is adapted to engage in the ratchet teeth 13$^a$.

The standard 13 has a strap or flat bar 21 secured adjacent its lower end which extends forwardly where it has its ends 21$^a$ bent laterally substantially at right angles. A member 22 comprises spaced portions 22$^a$ of comparatively narrow flat form adjacent its lower ends, which, respectively, contact with the ends 21$^a$ of member 21 and are secured thereto by headed rivets passing through portions 21$^a$, 22$^a$ and a bar 23, extending across the front of the portions 22$^a$ in alinement with member 21. It will be noted that members 22$^a$ diverge downwardly and said members are formed at their lower ends with upwardly directed hook portions 22$^b$ adapted to hook under the bottom rim 30$^a$ of the bucket or pail 30. The upper portions 22$^a$ of member 22 are bent rearwardly and extend in front of and over a plate 24 to which they are secured by suitable rivets. The plate 24 is apertured to receive the upper end of standard 13 and is held thereon by suitable cotter pins 25$^a$ extending through holes in said standard at each side thereof, said cotter pins being shown as extending at right angles to each other. A third cotter pin 25$^b$ extends through the standard 13 a short distance below the cotter pin 25$^a$ and is adapted to engage with the plate 12 when the standard is in its lowest position, at which time, the plate 17 engages in the notch 13$^b$ formed in standard 13. A U-shaped bail 25, preferably formed of a flat bar is riveted to the top of plate 24 at its bottom and is equipped with a revoluble handle 26 at its upper end journaled on a headed rivet 27 carried in the arms of member 25. A U-shaped rod 28 has its central portion extending through and journaled in the sides of member 25 and has its ends diverging and equipped with upwardly directed hooks 28$^a$ adapted to hook over the handle bail 29 of a pail 30, said hooks 28 preferably being disposed at each side of the revoluble handle 31 carried on said bail 29.

In operation, the device will be carried by the handle 25 and the standard 13 normally will be in its lowest position with the pawl plate 17 engaged in the notch 13$^b$. When the cow is to be milked, the operator will suitably locate the stool and will then set the bottom members of bucket or pail 30 into the hooked lower ends 22$^b$ of members 22$^a$ and will engage the bail 29 of the bucket in the hooked ends 28$^a$ of members 28. It will be noted that the hooks 28$^a$ will be disposed at each side of the handle 31, if there is such a handle on the bucket. The member 22$^a$ extends downwardly and outwardly from the standard 13 or the front of the stool and the bucket, when engaged in members 22$^b$ and 28$^a$ will stand in a very convenient position, as shown in Fig. 1. If it is desired to have the bucket at a greater height, the operator merely presses rearwardly on the finger-piece 17$^a$ of plate 17 to release said plate from the notch 13$^b$. The standard 13, together with the bucket, can now be raised as desired by lifting on handle 26. The spring 19 will move plate 17 into engagement with standard 13 so that when the handle 26 is released, said standard 13 will descend until one of the ratchet teeth 13$^a$ engages with plate 17, when the standard will be held in fixed position. It will be noted that the ratchet teeth 13$^a$ will readily pass plate 17 in the upward movement of the standard 13. The bucket is now very conveniently supported and the operator can proceed with the milking operation without having in any way to hold the bucket. When another cow is to be milked the operator may, if he so desires, carry the bucket and stool in assembled position by means of handle 26, or, if desired, the bucket can be carried separately.

From the above description it is seen that applicant has provided a very simple and efficient milking stool and pail holder. The stool is made extremely rugged to withstand rough handling and all of the parts are of strong and durable formation. Practically all of the parts are made from standard flat iron with the exception of standard 13 which can be made from ordinary piping. The device is extremely convenient and can be very rapidly manipulated. The device has been amply demonstrated in actual practice and found to be very successful and efficient.

It will, of course, be understood, that various changes may be made in the form, details, arrangement and proportions of the device without departing from the scope of applicant's invention, which, generally stated, consists in a device capable of carrying out the objects above set forth, in the novel parts and combinations of parts disclosed and defined in the appended claims.

What is claimed is:

1. A pail holder and milking stool having in combination, a stool, a pail-carrying means at one end thereof including a member having spaced upwardly directed members at its lower end adapted to engage under the lower edge of a pail, a vertically swinging member engaging the bail of said pail, and means carrying said pail-carrying means mounted on the stool for vertical movement, and means for holding said last mentioned means in different vertical positions.

2. A pail holder and milking stool device having in combination, a stool, a standard vertically movable at one end thereof, means for holding said standard in different vertical positions, a pail holding means carried by said standard including a means swingable about a horizontal axis and having spaced portions engaging the bail of the pail, and means engaging under the edge of said pail.

3. The structure set forth in claim 2, said last mentioned means including a member extending downwardly and outwardly from said standard and having laterally spaced upwardly directed hooks, and means rigidly connecting the same to said standard.

4. A pail holder and milking stool device having in combination, a stool, a standard vertically movable at one end thereof, means for holding said standard in different vertical positions, a member rigidly carried by said standard adjacent its top and extending downwardly and outwardly therefrom and having spaced upwardly directed hooks at its lower end adapted to engage under the bottom edge of a pail, a swinging bail at the top of said member having an upwardly directed hooked end adapted to engage the bail of said pail, and means for lifting said standard.

5. A pail holder and milking stool device having in combination, a stool having an aperture in its top front portion, a guide rod secured at its lower end to and spaced from the front of said stool and alined with said aperture, a hollow standard slidable on said rod and through said aperture having spaced teeth therein, a spring-pressed pawl at the top of said stool engageable with said teeth to hold said standard in different vertical positions, and spaced relatively movable means carried by said standard for engaging and supporting the pail.

In testimony whereof I affix my signature.

WILLIAM MILBRATH.